(12) United States Patent
Guan et al.

(10) Patent No.: US 10,295,856 B2
(45) Date of Patent: May 21, 2019

(54) DISPLAY PANEL AND DISPLAY DEVICE

(71) Applicant: Xiamen Tianma Micro-Electronics Co., Ltd., Xiamen (CN)

(72) Inventors: Linyan Guan, Xiamen (CN); Kangpeng Yang, Xiamen (CN); Yumin Xu, Xiamen (CN); Junyi Li, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/865,438

(22) Filed: Jan. 9, 2018

(65) Prior Publication Data

US 2019/0094588 A1 Mar. 28, 2019

(30) Foreign Application Priority Data

Sep. 28, 2017 (CN) .......................... 2017 1 0897366

(51) Int. Cl.
*G02F 1/1333* (2006.01)
*G06F 3/041* (2006.01)
*G09G 3/36* (2006.01)

(52) U.S. Cl.
CPC ........ *G02F 1/13338* (2013.01); *G06F 3/0412* (2013.01); *G06F 3/0414* (2013.01); *G09G 3/3611* (2013.01)

(58) Field of Classification Search
CPC . G02F 1/13338; G09G 3/3611; G06F 3/0412; G06F 3/0414
See application file for complete search history.

(56) References Cited

U.S. PATENT DOCUMENTS

2017/0242518 A1* 8/2017 Liu ....................... G06F 3/0414

\* cited by examiner

*Primary Examiner* — Abhishek Sarma
(74) *Attorney, Agent, or Firm* — Tarolli, Sundheim, Covell & Tummino LLP (57) ABSTRACT

A display panel and a display device, the display panel includes a thin film transistor arranged in a display area of the display panel, the thin film transistor including an active layer; a metal layer; a plurality of force sensors disposed in the same layer as the active layer or the metal layer, each force sensor including a first bridge arm, a second bridge arm, a third bridge arm, and a fourth bridge arm connected end-to-end in sequence; a plurality of regulation resistors one-to-one corresponding to each force sensor, a first end of the regulation resistor being connected with a voltage regulation end, a second end of the regulation resistor being connected with a regulation bridge arm of the force sensor corresponding to the force sensor, the regulation bridge arm being any one of the first bridge arm, second bridge arm, third bridge arm and fourth bridge arm.

17 Claims, 8 Drawing Sheets

DISPLAY PANEL AND DISPLAY DEVICE

CROSS-REFERENCE TO RELATED APPLICATIONS

The present application claims priority to Chinese Patent Application No. 201710897366.7, filed on Sep. 28, 2017, the content of which is incorporated herein by reference in its entirety.

TECHNICAL FIELD

The present disclosure relates to the field of display technologies and, in particular, to a display panel and a display device.

BACKGROUND

In order to achieve a more diverse and flexible way of human-machine interaction, in addition to detection of the touch location, the current touch display panel can also detect the magnitude of the force applied on the panel. The detection of the magnitude of the force on the panel can be achieved by a force sensor using the Wheatstone bridge principle. Ideally, the output of the force sensor is 0V, when a force is applied on the panel, the panel deforms, and the resistance of the force sensor changes, then the force sensor outputs a signal value related to the deformation extent of the panel.

However, due to the problem of production process, or the status changes of the sensor itself or the display panel resulting from the heat generation during working, the force sensor will output a signal value even when the panel is not subjected to a force, thereby resulting in the problem of abnormal force detection.

SUMMARY

The present disclosure provides a display panel and a display device, which can make improvements with respect to the problem of abnormal force detection.

In one aspect, the present disclosure provides a display panel, including: a thin film transistor arranged in a display area of the display panel, the thin film transistor comprising an active layer; a metal layer; a plurality of force sensors disposed in a same layer as one of the active layer and the metal layer, each of the plurality of force sensors comprising a first bridge arm, a second bridge arm, a third bridge arm, and a fourth bridge arm connected end-to-end in sequence; and a plurality of regulation resistors, each corresponding to a respective one of the plurality of force sensors, each of the plurality of regulation resistors comprises a first end connected to a voltage regulation end and a second end connected to a regulation bridge arm of the respective force sensor, wherein each regulation bridge arm is any one of the first bridge arm, the second bridge arm, the third bridge arm, and the fourth bridge arm of the respective force sensor.

In another aspect, the present disclosure provides a display device, including: the above-described display panel and a control module. the control module is configured to, during a zero-setting mode, adjust a voltage value Ua at the voltage regulation end within a preset range, and acquire an output voltage difference Uo between two output ends of the force sensor; when Uo reaches a preset condition, the zero-setting mode terminates, take Ua at this moment as a replacement voltage value Uc, and take Uc as the voltage value at the voltage regulation end.

As for the display panel and display device in the embodiment of the present disclosure, a regulation resistor corresponding to each force sensor is provided. When the display panel is not subjected to a force but the four bridge arms of the force sensor are in an unbalance state, a voltage can be applied to the regulation bridge arm via the regulation resistor, so that the voltage at the first output end is equal or close to the voltage at the second output end when the panel is not subjected to a force. After the regulation by the regulation resistor, it can be considered that the bridge arms of the force sensor are in a balance state, and then, the force detection result obtained will be more accurate when the force detection is conducted, thereby making improvements with respect to the problem of abnormal force detection.

BRIEF DESCRIPTION OF DRAWINGS

In order to more clearly illustrate technical solutions in embodiments of the present disclosure, the accompanying drawings used in the embodiments are briefly introduced as follows. Obviously, the drawings described as follows are merely a part of the embodiments of the present disclosure, and other drawings can also be acquired by those skilled in the art without paying creative efforts.

DESCRIPTION OF EMBODIMENTS

In order to illustrate the purposes, technical solutions and advantages of the present disclosure more clearly, the technical solutions of the present disclosure will be clearly and fully described with reference to the accompanying drawings in the embodiments of the present disclosure. Obviously, the described embodiments are merely exemplary embodiments of the present disclosure, but not all of the embodiments. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
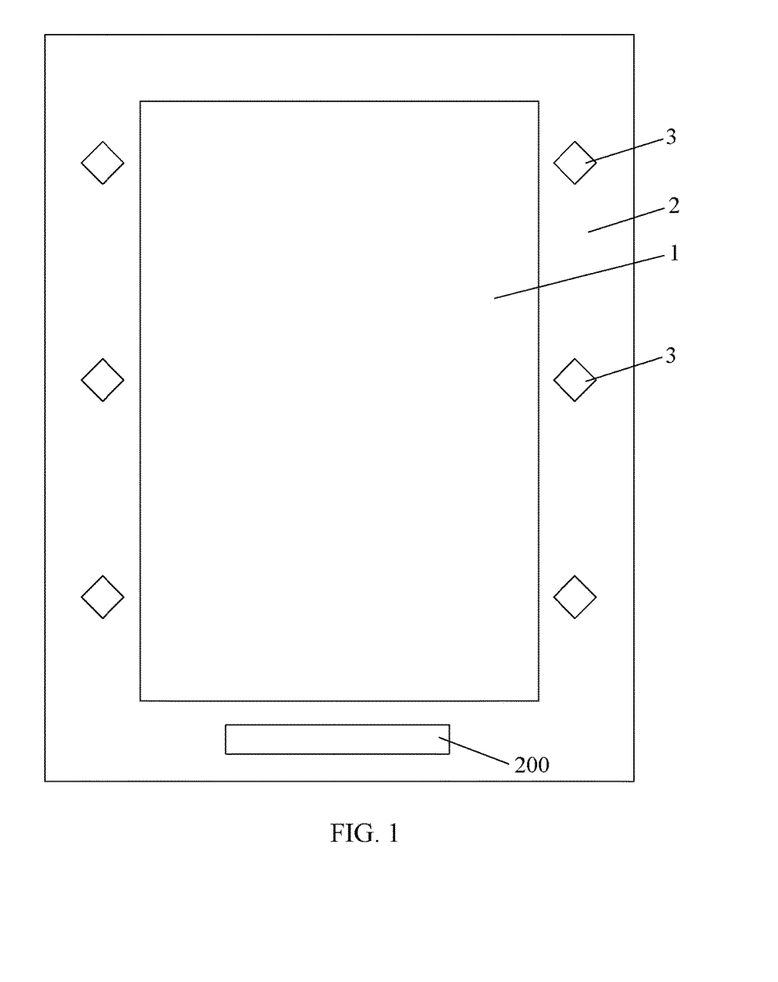
FIG. 1 is a structural schematic diagram of a display panel in an embodiment of the present disclosure.
Figure 2:
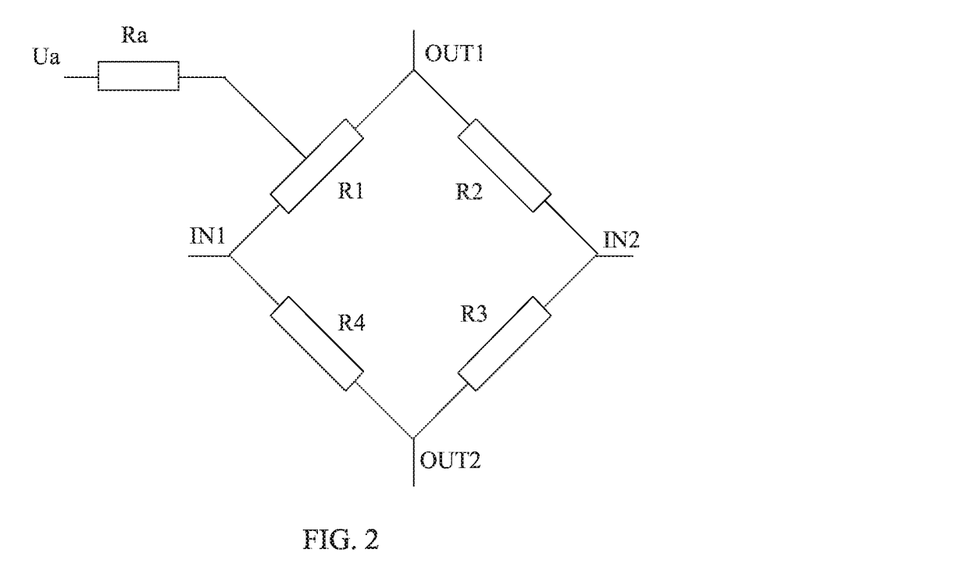
FIG. 2 is an enlarged schematic diagram of a portion of the display panel in FIG. 1.
Figure 3:
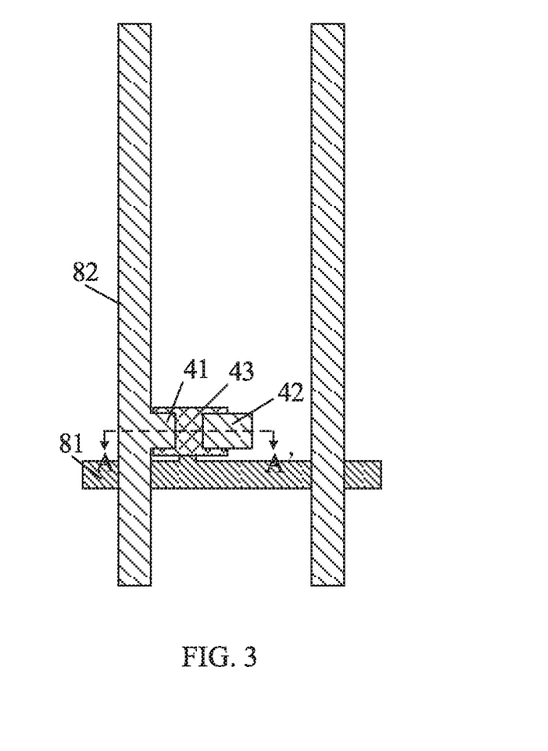
FIG. 3 is an enlarged schematic diagram of a portion of the display area of the display panel in FIG. 1.
Figure 4:
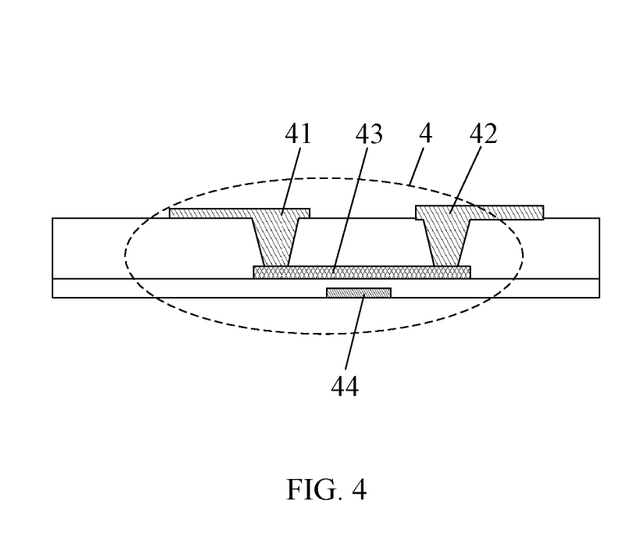
FIG. 4 is a cross-sectional structural schematic view along line AA' in FIG. 3.

As shown in FIG. 1, FIG. 1 is a structural schematic diagram of a display panel in an embodiment of the present disclosure. The present disclosure provides a display panel, including: a display area 1, a non-display area 2, and a plurality of force sensors 3 located in the display area 1 or in the non-display area 2. The embodiment of the present disclosure will be described by an example that the force sensors 3 are only disposed in the non-display area 2. As shown in FIG. 2, FIG. 2 is an enlarged schematic view of a portion of the display panel in FIG. 1, each force sensor 3 includes a first bridge arm R1, a second bridge arm R2, a third bridge arm R3 and a fourth bridge arm R4 connected end-to-end in sequence; as shown in FIG. 3 and FIG. 4, FIG. 3 is an enlarged schematic diagram of a portion of the display area of the display panel in FIG. 1, and FIG. 4 is a cross-sectional structural schematic view along line AA' in FIG. 3. The display panel includes a thin film transistor 4 located in the display area 1, and the thin film transistor 4 includes a source electrode 41, a drain electrode 42, an active layer 43 and a gate electrode 44. The display panel further includes a metal layer, the metal layer may be a layer desired by any metal structure, such as a source-drain electrode metal layer or a gate electrode metal layer, wherein the source-drain electrode metal layer is a layer where the source electrode 41 and the drain electrode 42 are located, and the gate electrode metal layer is a layer where the gate electrode 44 is located; the force sensor 3 is disposed in the same layer as the active layer 43 or the above-described metal layer, i.e., the force sensor 3 may be made of a semiconductor material or a metal material, if the force sensor 3 is made of a semiconductor material, the force sensor 3 is disposed in the same layer as the active layer 43 so as to form the force sensor 3 at the same time when manufacturing the active layer 43, if the force sensor 3 is made of a metal material, the force sensor 3 is disposed in the same layer as other metal layers so as to form the force sensor 3 at the same time when manufacturing the other metal layers. As shown in FIG. 2, there is a regulation resistor Ra corresponding to each force sensor 3, a first end of the regulation resistor Ra is connected with a voltage regulation end Ua, and a second of the regulation resistor Ra is connected with a regulation bridge arm of the corresponding force sensor 3, and the regulation bridge arm is any one of the first bridge arm R1, the second bridge arm R2, the third bridge arm R3 and the fourth bridge arm R4, in the following contents, the present disclosure will be described by an example that only the first bridge arm R1 is the regulation bridge arm.

As shown in FIG. 2, in each force sensor, a first input end IN1 is disposed at a connection between the first bridge arm R1 and the fourth bridge arm R4, and a second input end IN2 is disposed at a connection between the second bridge arm R2 and the third bridge arm R3, a first output end OUT1 is disposed at a connection between the bridge arm R1 and the second bridge arm R2, and a second output end OUT2 is disposed at a connection between the third bridge arm R3 and the fourth bridge arm R4. If the regulation bridge arm Ra is not provided, in an ideal case, when the display panel is not deformed, the resistance ratio of the first bridge arm R1 to the second bridge arm R2 is equal to the resistance ratio of the fourth bridge arm R4 to the third bridge arm R3, the bridge reaches a balance state, the voltage value at the first output end OUT1 is equal to a voltage value at the second output end OUT2; when the display panel is deformed, all the above-described four bridges arm will be deformed, resulting in resistance change of each bridge arm, so that the balance state of the bridge is interrupted, that is, the resistance ratio of the first bridge arm R1 to the second bridge arm R2 is not equal to the resistance ratio of the fourth bridge arm R4 to the third bridge arm R3, and the voltage value at the first output end OUT1 is not equal to a voltage value at the second output end OUT2, the difference between the voltage value at the first output end OUT1 and the voltage value at the second output end OUT2 corresponds to the force value applied on the display panel, during the force detection process, the corresponding force value can be obtained by obtaining the difference between the voltage value at the first output end OUT1 and the voltage value at the second output end OUT2. However, the force detection process of the above-described display panel is only a method in an ideal state, as for an actual display panel, due to the problem during the production process, or the status changes of the sensor itself or the display panel resulting from the heat generation during working, the force sensor will output a signal value even when the panel is not subjected to a force, that is, when the display panel is not subjected to a force, the above-described bridge has already been in an unbalance state, i.e., the resistance ratio of the first bridge arm R1 to the second bridge arm R2 is not equal to the resistance ratio of the fourth bridge arm R4 to the third bridge arm R3, and the force detection in such a state will result in an inaccurate detection result, which leads to the problem of abnormal force detection Therefore, in order to solve this problem, the present disclosure provides a regulation resistor Ra corresponding to each force sensor 3. When the display panel is not subjected to a force but the four bridge arms of the force sensor are in an unbalance state, a voltage can be applied to the regulation bridge arm via the regulation resistor Ra, and a compensation can be made by regulating the voltage applied on the regulation bridge arm, so that the voltage at the first output end OUT1 is equal or close to the voltage at the second output end OUT2 when the panel is not subjected to a force. After the regulation by the regulation resistor Ra, it can be considered that the bridge arms of the force sensor 3 are in a balance state, and then, the force detection result obtained will be more accurate when the force detection is conducted.

As for the display panel in the embodiment of the present disclosure, a regulation resistor is correspondingly provided for each force sensor. When the display panel is not subjected to a force but the four bridge arms of the force sensor are in an unbalance state, a voltage can be applied to the regulation bridge arm via the regulation resistor, so that the voltage at the first output end is equal or close to the voltage at the second output end when the panel is not subjected to a force. After regulation by the regulation resistor, it can be considered that the bridge arms of the force sensor are in a balance state, and then, the force detection result obtained will be more accurate when the force detection is conducted, thereby making improvements with respect to the problem of abnormal force detection.

It should be noted that, there are two setting schemes for the regulation resistor Ra, which are called a first setting scheme and a second setting scheme. In the first setting scheme, the regulation resistor Ra is involved in the strain of the corresponding force sensor 3; and in the second setting scheme, the regulation resistor Ra is not involved in the strain of the corresponding force sensor 3. The specific implementation of the first setting scheme and the second setting scheme will be described in detail below.

Figure 5:
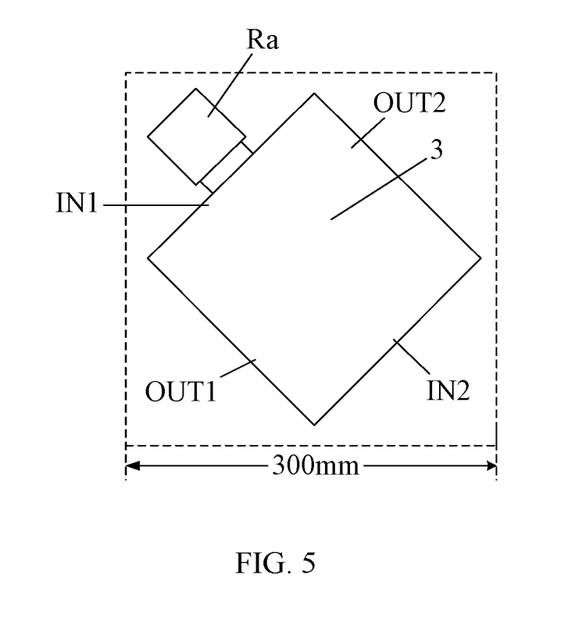
FIG. 5 is another enlarged schematic view of a portion of the display panel in FIG. 1.

Optionally, as shown in FIG. 5, FIG. 5 is another enlarged schematic view of a portion of the display panel in FIG. 1, in the first setting scheme, the regulation resistor Ra and the corresponding force sensor 3 are located in a rectangular area; the length of each edge of the rectangular area is less than 300 μm; the regulation resistor Ra has the same strain sensitivity as the regulation arm of the corresponding force sensor 3, and the strain sensitivity means, under a certain force, a ratio of the change rate of the resistance of the bridge arm to the strain (in the strain axis direction) of the surface of the member causing this resistance change.

Normally, the size of force sensor 3 is within the range of 300 μm, in order to make full utilization of the space of the display panel and to make the regulation resistor Ra be as close as possible to the corresponding force sensor 3, the regulation resistor Ra can be disposed nearby the regulation bridge arm of the force sensor 3. In the first setting scheme, since the regulation resistor Ra is very close to the corresponding force sensor 3, and they have the same strain sensitivity, therefore, when the display panel is subjected to a force, the regulation resistor Ra and the corresponding regulation bridge arm of the force sensor 3 have the same strain, so the force detection process with respect to the force sensor 3 will not be adversely affected by providing the regulation resistor Ra.

Figure 6:
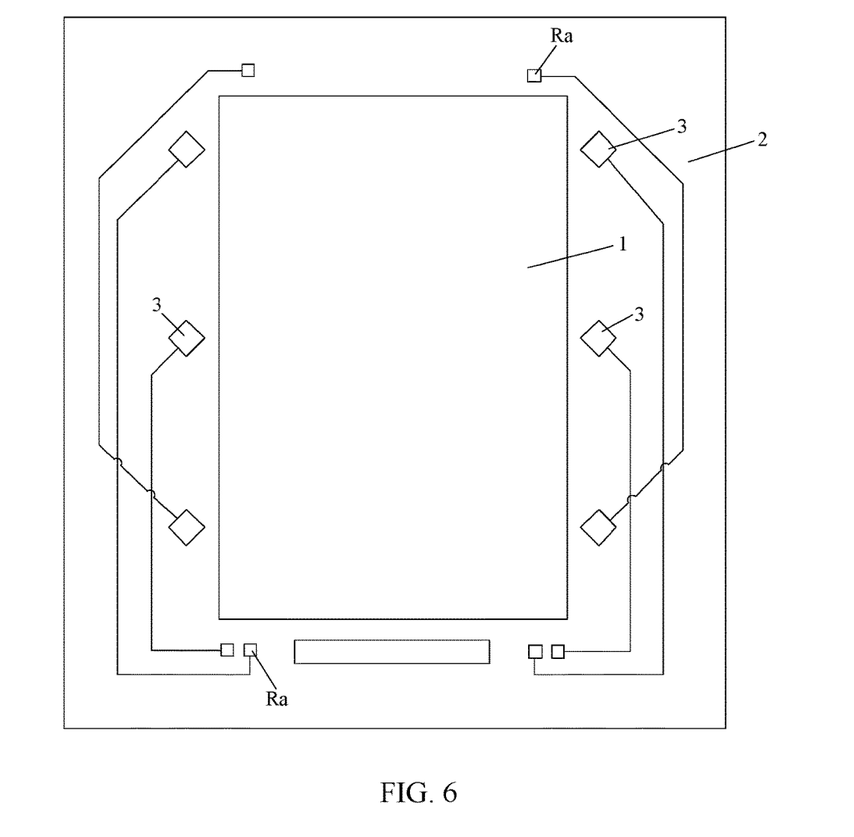
FIG. 6 is a structural schematic diagram of another display panel in an embodiment of the present disclosure.

Optionally, as shown in FIG. 6, FIG. 6 is a structural schematic diagram of another display panel in an embodiment of the present disclosure; in the second setting scheme, the distance between the regulation resistor Ra and the corresponding force sensor 3 is greater than or equal to 6 cm; or, the ratio of the strain sensitivity of the regulation resistor Ra to the strain sensitivity of the regulation bridge arm of the corresponding force sensor 3 is less than 5%.

In one aspect, as shown in FIG. 6, when the distance between the regulation resistor Ra and the corresponding force sensor 3 is greater than or equal to 6 cm, it can be considered that the regulation resistor Ra is not involved in the strain of the corresponding force sensor 3, for example, a plurality of force sensors 3 is respectively disposed in the non-display area 2 at the left and right sides of the display area 1, a plurality of regulation resistors Ra is respectively disposed in the non-display area 2 at the upper and lower sides of the display area 1. As for the force sensor 3 close to the upper side of the display panel, its corresponding regulation resistor Ra is disposed at the lower side of the display panel; and as for the force sensor 3 close to the lower side of the display panel, its corresponding the regulation resistor Ra is disposed at the lower side of the display panel. In this way, it can be achieved that the regulation resistor Ra is arranged far from the corresponding force sensor 3. It should be understood that, the setting scheme of the regulation resistor Ra and the force sensor 3 in FIG. 6 is only an example, and the specific setting scheme of the two is not limited by the present disclosure, as long as it is ensured that the distance between the regulation resistor Ra and the corresponding force sensor 3 is greater than or equal to 6 cm. In another aspect, it is also possible to set the ratio of the strain sensitivity of the regulation resistor Ra to the strain sensitivity of the regulation bridge arm of the corresponding force sensor 3 to be less than 5%, in this case, it is not necessary to set the distance between the regulation resistor Ra and the corresponding force sensor 3 to be greater than or equal to 6 cm, since the strain generated by the regulation resistor Ra has a small impact (which can be ignored) on the force sensor 3 under the same force, therefore, wherever the regulation resistor Ra is disposed, it can be considered that the regulation resistor Ra is not involved in the strain of the corresponding sensor 3.

In the following, the regulation principle of the force sensor corresponding to the first setting scheme and the second setting scheme will be described through specific examples.

Figure 7:
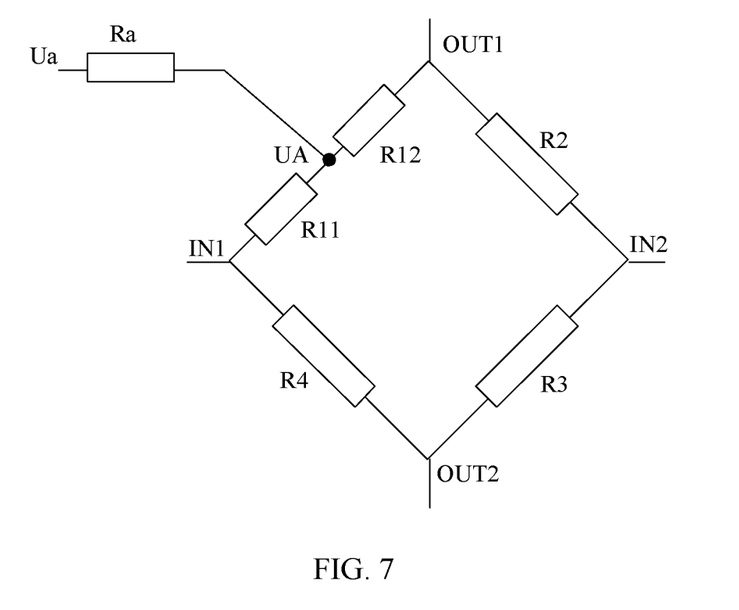
FIG. 7 is a schematic diagram of an equivalent circuit corresponding to FIG. 2.

As shown in FIG. 7, FIG. 7 is a schematic diagram of an equivalent circuit corresponding to FIG. 2. When the regulation resistor Ra is connected with the first bridge arm, it is regarded that the first bridge arm is formed by a first sub-resistor R11 and a second sub-resistor R12, and the first sub-resistor R11 and the second sub-resistor R12 are connected in series between the first input end IN1 and the first output end OUT1, the connection between the first sub-resistor R11 and the second sub-resistor R12 is a first node UA, and the regulation resistor Ra is connected between a voltage regulation end Ua and the first node UA. Ideally, when four bridge arms of the force sensor are in a balance state, the four bridge arms have the same resistance, if the force sensor is in an abnormal unbalance state, the resistance of at least one of the four bridge arms is different from the resistances of the other bridge arms. It is assumed that the resistance of the first bridge arm is different from the resistances of the other bridge arms, the per-unit value of each variable will be calculated as follows, for example, assuming that Ra=R11=1, R12=2, R2=R3=R4=m, m≠3, wherein R11 is the resistance of the first sub-resistor R11, R12 is the resistance of the second sub-resistor R12, R2 is the resistance of the second bridge arm R2, R3 is the resistance of the third bridge arm R3, R4 is the resistance of the fourth bridge arm R4, in addition, under the same force, the first bridge arm R1 and the third bridge arm R3 have a first resistance change coefficient $\varepsilon 1$, a resistance change coefficient is defined as $$\frac{\Delta R + R'}{R'},$$

wherein $\Delta R$ is the resistance change of the bridge arm, R' is the resistance of the bridge arm when the bridge arm is not subjected to a force, the second bridge arm R2 and the fourth bridge arm R4 have a second resistance change coefficient $\varepsilon 2$.

As for the first setting scheme, according to Kirchhoff's first law, when the force sensor 3 is not subjected to a force, the sum of the currents flowing into the first node UA is equal to the sum of the currents flowing out of the first node UA. Equation 1 can be obtained as follows:

$$\frac{Uin1 - UA}{1} + \frac{Ua - UA}{1} = \frac{UA - Uout1}{2},$$

Uin1 is the voltage value at the first input end IN1, UA is the voltage value at the first node UA, Ua is the voltage value at the voltage regulation end Ua, Uout1 is the voltage value at the first output end OUT1. It is assumed that the voltage value at the second input end IN2 is 0, on the basis of that the sum of the currents flowing into the first node UA is equal to the sum of the currents flowing out of the first node UA, Equation 2 can also be obtained:

$$\frac{Uin1 - UA}{1} + \frac{Ua - UA}{1} = \frac{UA - 0}{2 + m},$$

it is assumed that the voltage value at the first output end OUT1 is equal to the voltage value at the second output end OUT2, that is, it is assumed that the force sensor is in a balance state, in this case, there is Equation 3: Uin1=2Uout1, combining Equations 1, 2 and 3, and it is obtained that:

$$Ua = \frac{3 + 2m}{2m} \times Uin1,$$

since both m and Uin1 are constants, therefore Ua is also a constant, that is, when the force sensor is in an abnormal unbalance state, the force sensor can be brought into a balance state by setting the voltage value at the voltage regulation end Ua to be a constant. Since the resistance change coefficient $$\varepsilon = \frac{\Delta R + R'}{R'},$$

i.e., $\Delta R + R' = \varepsilon R'$, wherein $\Delta R$ is the resistance change of the bridge arm, R' is the resistance of the bridge arm when the bridge arm is not subjected to a force, $\Delta R+R'$ is the resistance of the bridge arm when the bridge arm is not subjected to a force, U' is the voltage value assigned to $\Delta R+R'$ when subjected to a force, then $$\frac{U'}{\Delta R + R'} = \frac{U'}{R' \varepsilon}.$$

When the force sensor 3 is subjected to a force, on the basis of that the sum of the currents flowing into the first node UA is equal to the sum of the currents flowing out of the first node UA, Equation 4 can be obtained:

$$\frac{Uin1 - UA'}{\varepsilon 1} + \frac{Ua - UA'}{\varepsilon 1} = \frac{UA' - Uout1'}{2 \times \varepsilon 1},$$

UA' is the voltage value at the first node UA, Uout1' is the voltage value at the first output end OUT1, on the basis of that the sum of the currents flowing into the first node UA is equal to the sum of the currents flowing out of the first node UA, Equation 5 can also be obtained:

$$\frac{Uin1 - UA'}{\varepsilon 1} + \frac{Ua - UA'}{\varepsilon 1} = \frac{UA' - 0}{2 \times \varepsilon 1 + m \times \varepsilon 2},$$

it is assumed that the voltage value at the first output end OUT1 is equal to L1 multiplied by the voltage value at the first input end IN1, i.e., in this case, there is Equation 6: Uout1'=L1×Uin1, combining the Equations 4, 5 and 6, it is obtained that:

$$L1 = \frac{(3 + 7m) \times \varepsilon 2 + 10 \times \varepsilon 1}{5 \times \varepsilon 1 + 2m \times \varepsilon 2},$$

on the basis of that the sum of the currents flowing into the first node UA is equal to the sum of the currents flowing out of the first node UA, Equation 7 can be obtained:

$$\frac{Uout2'}{m \times \varepsilon 1} = \frac{Uin}{m \times \varepsilon 1 + m \times \varepsilon 2},$$

i.e., $$Uout2' = \frac{\varepsilon 1}{\varepsilon 1 + \varepsilon 2} \times Uin = L2 \times Uin,$$

Uout2' is the voltage value at the second output end OUT2, U'=Uout1'−Uout2'=(L1−L2)×Uin, U' is the voltage value difference between the voltage value at the first output end OUT1 and the voltage value at the second output end OUT2, which is used to determine the force value during the force detection process.

As for the second setting scheme, when the force sensor 3 is not subjected to a force, the calculation process and result is the same as the first setting scheme, it can obtained that:

$$Ua = \frac{3 + 2m}{2m} \times Uin1.$$

When the force sensor 3 is subjected to a force, on the basis of that the sum of the currents flowing into the first node UA is equal to the sum of the currents flowing out of the first node UA, Equation 8 can be obtained:

$$\frac{Uin1 - UA'}{\varepsilon 1} + \frac{Ua - UA'}{1} = \frac{UA' - Uout1'}{2 \times \varepsilon 1},$$

and on the basis of that the sum of the currents flowing into the first node UA is equal to the sum of the currents flowing out of the first node UA, Equation 9 can also be obtained:

$$\frac{Uin1 - UA'}{\varepsilon 1} + \frac{Ua - UA'}{1} = \frac{UA' - 0}{2 \times \varepsilon 1 + m \times \varepsilon 2},$$

in addition, there is Equation 10: U'=Uout1'−Uout2'=L×Uin, U' is the voltage value difference between the voltage value at the first output end OUT1 and the voltage value at the second output end OUT2, which is used to determine the force value during the force detection process, when combining the equations 8, 9 and 10, it can be obtained that:

$$U' = L \times Uin = \left[\frac{1}{1 + \varepsilon 1} + \left(\frac{3 - 2\varepsilon 1}{1 + \varepsilon 1}\right) \times \left(\frac{3 + 2m}{2m}\right) - \frac{\varepsilon 1}{\varepsilon 1 + \varepsilon 2}\right] \times Uin.$$

Figure 8:
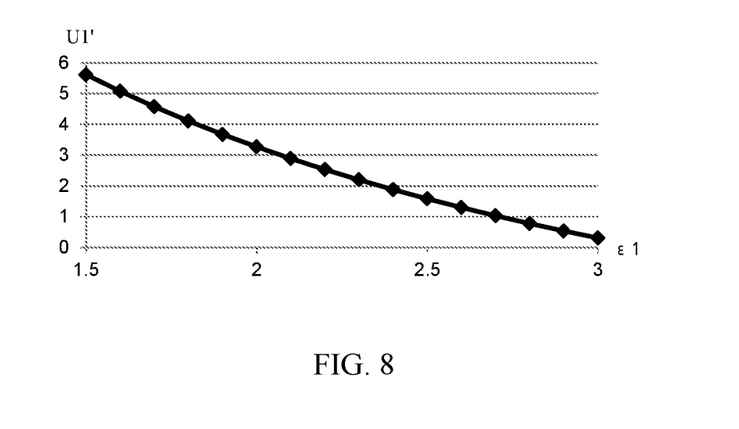
FIG. 8 is a schematic diagram of a first simulation result of a first scheme in an embodiment of the present disclosure.
Figure 9:
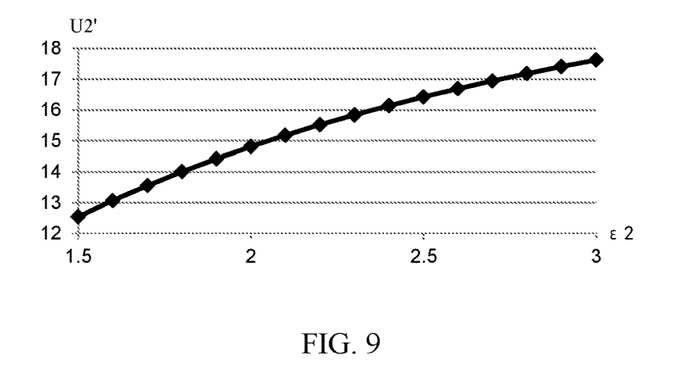
FIG. 9 is a schematic diagram of a second simulation result of the first scheme in an embodiment of the present disclosure.
Figure 10:
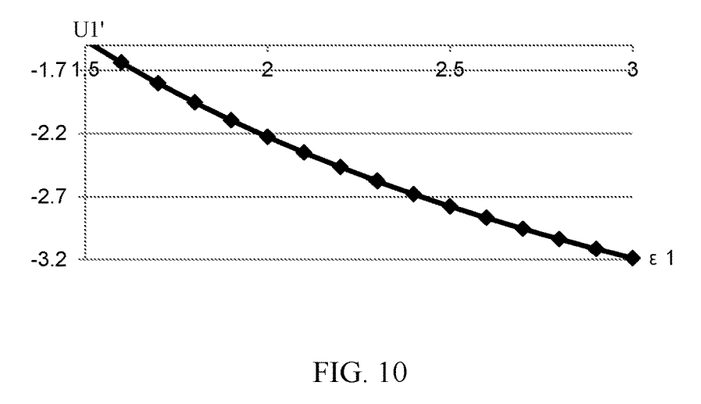
FIG. 10 is a schematic diagram of a first simulation result of a second scheme in an embodiment of the present disclosure.
Figure 11:
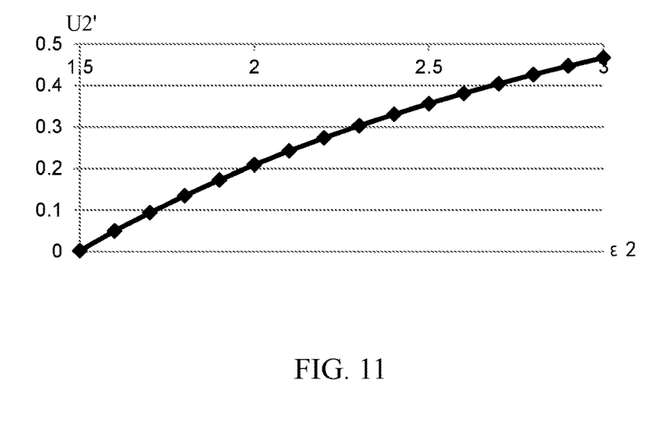
FIG. 11 is a schematic diagram of a second simulation result of the second scheme in an embodiment of the present disclosure.

As for the first setting scheme and the second setting scheme, respectively according to the above per-unit, the relationship between U' and the strain of each bridge arm is simulated under the principle of a single variable, as shown in FIGS. 8-11, FIG. 8 is a schematic diagram of a first simulation result of a first setting scheme in an embodiment of the present disclosure, FIG. 9 is a schematic diagram of a second simulation result of the first setting scheme in an embodiment of the present disclosure, FIG. 10 is a schematic diagram of a first simulation result of the second setting scheme in an embodiment of the present disclosure, and FIG. 11 is a schematic diagram of a second simulation result of a second setting scheme in an embodiment of the present disclosure. As shown in FIG. 8, assuming $\varepsilon 2=1$, and in the diagram the corresponding relationship between $\varepsilon 1$ and U1' is simulated in the process when $\varepsilon 1$ changes from 1.5 to 3, U1' is the voltage value difference between the voltage value at the first output end OUT1 and the voltage value at the second output end OUT2. As shown in FIG. 9, assuming $\varepsilon 1=1$, and in the diagram the corresponding relationship between $\varepsilon 2$ and U2' is simulated in the process when $\varepsilon 2$ changes from 1.5 to 3, U2' is the voltage value difference between the voltage value at the first output end OUT1 and the voltage value at the second output end OUT2. As shown in FIG. 10, assuming $\varepsilon 2=1$, and in the diagram the corresponding relationship between $\varepsilon 1$ and U1' is simulated in the process when $\varepsilon 1$ changes from 1.5 to 3, U1' is the voltage value difference between the voltage value at the first output end OUT1 and the voltage value at the second output end OUT2. As shown in FIG. 11, assuming $\varepsilon 1=1$, and in the diagram the corresponding relationship between $\varepsilon 2$ and U2' is simulated in the process when $\varepsilon 2$ changes from 1.5 to 3, U2' is the voltage value difference between the voltage value at the first output end OUT1 and the voltage value at the second output end OUT2. The following equation can be approximately obtained from the curve in FIG. 8: U1'=$-2\times\varepsilon 1+z1$, wherein z1 is a constant; the following equation can be approximately obtained from the curve in FIG. 9: U2'=$2\times\varepsilon 2+z2$, wherein z2 is a constant; the following equation can be approximately obtained from the curve in FIG. 10: U1'=$-0.5\times\varepsilon 1+z3$, wherein z3 is a constant; the following equation can be approximately obtained from the curve in FIG. 11: U2'=$0.16\times\varepsilon 2+z4$ wherein z4 is a constant. Since U1' and U2' in FIG. 8 and FIG. 9 are respectively the output values of the force sensor when one of $\varepsilon 1$ and $\varepsilon 2$ is taken as a variable, and $\varepsilon 1$ and $\varepsilon 2$ will change at the same time when the display panel is actually subjected to a force, therefore, by combining the equations corresponding to FIG. 8 and FIG. 9, it can be obtained: UA'=U1'+U2'=$-2\times\varepsilon 1+z1+2\times\varepsilon 2+z2$, UA' is the voltage value difference between the voltage value at the first output end OUT1 and the voltage value at the second output end OUT2 when $\varepsilon 1$ and $\varepsilon 2$ simultaneously change in the first setting scheme. Similarly, by combining the equations corresponding to FIG. 10 and FIG. 11, it can be obtained: UB'=U1'+U2'=$-0.5\times\varepsilon 1+z3+0.16\times\varepsilon 2+z4$, UB' is the voltage value difference between the voltage value at the first output end OUT1 and the voltage value at the second output end OUT2 when $\varepsilon 1$ and $\varepsilon 2$ simultaneously change in the second setting scheme. Since $\varepsilon 1$ and $\varepsilon 2$ represent the resistance change coefficients of different bridge arms under the same force, it is assumed that the first bridge arm R1 and the third bridge arm R3 have a first strain sensitivity A, the second bridge arm R2 and the fourth bridge arm R4 have a second strain sensitivity B, meanwhile according to the equations corresponding to UA' and UB', the following two equations can be approximately obtained: Equation One: UA'=$-2\times A\times X+z1+2\times B\times X+z2$ Equation Two: UB'=$-0.5\times A\times X+z3+0.16\times B\times X+z4$, wherein the variable X represents the force value applied on the force sensor, the larger the coefficient of the variable X, the greater the voltage value difference between the voltage value at the first output end OUT1 and the voltage value at the second output end OUT2 under the same force, i.e., the higher the sensitivity of the force sensor. Therefore, comparing the coefficient of the variable X in Equation One with that in Equation Two, the coefficient of the variable X in Equation One is: M=$-2A+2B$, the coefficient of the variable X in Equation Two is: N=$-0.5A+0.16B$, if $|M|>|N|$, it indicates that the corresponding setting of A and B is more applicable for the first setting scheme, if $|M|<|N|$, it indicates that the corresponding setting of A and B is more applicable for the second setting scheme, and if $|M|=|N|$, then it indicates that the corresponding setting of A and B is equally applicable for the first setting scheme and the second setting scheme.

The following is a calculation process of the relation between A and B when $|M|>|N|$:

If M>0 and N>0, then $$\text{Formula ①} \begin{cases} M > N \\ M > 0 \\ N > 0 \end{cases} \Rightarrow \begin{cases} -2A + 2B > -0.5A + 0.16B \\ -2A + 2B > 0 \\ -0.5A + 0.16B > 0 \end{cases} \Rightarrow \begin{cases} B > 0.815A \\ B > A \\ B > 3.125A \end{cases},$$

If A>0 and B>0, then it is further required that B>3.125A to meet Formula ①,
If A>0 and B<0, then it does not meet Formula ①,
If A<0 and B>0, then it meets Formula ①,
If A<0 and B<0, then it is further required that B>0.815A to meet Formula ①;
If M>0 and N<0, then $$\text{Formula ②} \begin{cases} M > -N \\ M > 0 \\ N < 0 \end{cases} \Rightarrow \begin{cases} -2A + 2B > -0.5A + 0.16B \\ -2A + 2B > 0 \\ -0.5A + 0.16B < 0 \end{cases} \Rightarrow \begin{cases} B > 1.157A \\ B > A \\ B < 3.125A \end{cases},$$

If A>0 and B>0, then it is further required that 3.125A>B>1.157A to meet Formula ②,
If A>0 and B<0, then it does not meet Formula ②,
If A<0 and B>0, then it does not meet Formula ②,
If A<0 and B<0, then it does not meet Formula ②;
If M<0 and N>0, then $$\text{Formula ③} \begin{cases} -M > -N \\ M < 0 \\ N > 0 \end{cases} \Rightarrow \begin{cases} 2A - 2B > -0.5A + 0.16B \\ -2A + 2B < 0 \\ -0.5A + 0.16B > 0 \end{cases} \Rightarrow \begin{cases} B < 1.157A \\ B < A \\ B > 3.125A \end{cases},$$

If A>0 and B>0, then it does not meet Formula ③,
If A>0 and B<0, then it does not meet Formula ③,
If A<0 and B>0, then it does not meet Formula ③,
If A<0 and B<0, then it is further required that 1.157A>B>3.125A to meet Formula ③;
If M<0 and N<0, then $$\text{Formula ④} \begin{cases} -M > -N \\ M < 0 \\ N < 0 \end{cases} \Rightarrow \begin{cases} 2A - 2B > 0.5A - 0.16B \\ -2A + 2B < 0 \\ -0.5A + 0.16B < 0 \end{cases} \Rightarrow \begin{cases} B < 0.815A \\ B < A \\ B < 3.125A \end{cases},$$

If A>0 and B>0, then it is further required that B<0.815A to meet Formula ④,
If A>0 and B<0, then it meets Formula ④, If A<0 and B>0, then it does not meet Formula ④,
If A<0 and B<0, then it is further required that B<3.125A to meet Formula ④.

The following is a calculation process of the relation between A and B when |M|<|N|:

If M>0 and N>0, then $$\text{Formula ⑤} \begin{cases} M < N \\ M > 0 \\ N > 0 \end{cases} \Rightarrow \begin{cases} -2A + 2B < -0.5A + 0.16B \\ -2A + 2B > 0 \\ -0.5A + 0.16B > 0 \end{cases} \Rightarrow \begin{cases} B < 0.815A \\ B > A \\ B > 3.125A \end{cases},$$

If A>0 and B>0, then it does not meet Formula ⑤,
If A>0 and B<0, then it does not meet Formula ⑤,
If A<0 and B>0, then it does not meet Formula ⑤,
If A<0 and B<0, then it is further required that 0.815A>B>A to meet Formula ⑤;

If M>0 and N<0, then $$\text{Formula ⑥} \begin{cases} M < -N \\ M > 0 \\ N < 0 \end{cases} \Rightarrow \begin{cases} -2A + 2B < 0.5A - 0.16B \\ -2A + 2B > 0 \\ -0.5A + 0.16B < 0 \end{cases} \Rightarrow \begin{cases} B < 1.157A \\ B > A \\ B < 3.125A \end{cases},$$

If A>0 and B>0, then it is further required that 1.157A>B>A to meet Formula ⑥,
If A>0 and B<0, then it does not meet Formula ⑥,
If A<0 and B>0, then it does not meet Formula ⑥,
If A<0 and B<0, then it does not meet Formula ⑥;

If M<0 and N>0, then $$\text{Formula ⑦} \begin{cases} -M < N \\ M < 0 \\ N > 0 \end{cases} \Rightarrow \begin{cases} 2A - 2B < -0.5A + 0.16B \\ -2A + 2B < 0 \\ -0.5A + 0.16B > 0 \end{cases} \Rightarrow \begin{cases} B > 1.157A \\ B < A \\ B > 3.125A \end{cases},$$

If A>0 and B>0, then it does not meet Formula ⑦,
If A>0 and B<0, then it does not meet Formula ⑦,
If A<0 and B>0, then it does not meet Formula ⑦,
If A<0 and B<0, then it is further required that A>B>1.157A to meet Formula ⑦;

If M<0 and N<0, then $$\text{Formula ⑧} \begin{cases} -M > -N \\ M < 0 \\ N < 0 \end{cases} \Rightarrow \begin{cases} 2A - 2B < 0.5A - 0.16B \\ -2A + 2B < 0 \\ -0.5A + 0.16B < 0 \end{cases} \Rightarrow \begin{cases} B > 0.815A \\ B < A \\ B < 3.125A \end{cases},$$

If A>0 and B>0, then it is further required that A>B>0.815A to meet Formula ⑧,
If A>0 and B<0, then it does not meet Formula ⑧,
If A<0 and B>0, then it does not meet Formula ⑧,
If A<0 and B<0, then it does not meet Formula ⑧.

In summary, the setting manner of A and B corresponding to the case |M|>|N| is that:
one of A and B is a negative number while the other one is a positive number, or, the following condition is satisfied when both A and B are negative numbers or both A and B positive numbers:
when A>0, and B>0, then B>3.125A, 3.125A>B>1.157A, or B<0.815A;
when A<0 and B<0, then B>0.815A, or 1.157A>B>3.125A, or B<3.125A.

The setting manner of A and B corresponding to the case |M|<|N| is that:
both A and B are negative numbers or both A and B positive numbers, and the following condition is satisfied:
when A>0 and B>0, then 1.157A>B>A, or A>B>0.815A;
when A<0 and B<0, then 0.815A>B>A, or A>B>1.157A.

Since the above values are calculated in a specific example, in other embodiments, in the calculation process of Formulas ① to Formula ⑧, the coefficients of A and B may be different from those of the above calculation process, thereby leading to that, in the result that represents the relationship between A and B in each Formula, the coefficient of A is different from that of the above calculation process, in the result, the relation between B and $m_i$A is taken as a standard, $m_i$ is the coefficient of A, but whatever the coefficients of A and B, a conclusion having a certain rule can be achieved via Formulas ① to Formula ⑧, 3.125 is replaced by a constant $m_1$ greater than 0, 1.157 is replaced by a constant $m_2$ greater than 0, 1 is replaced by a constant $m_3$ greater than 0, and 0.815 is replaced by a constant $m_4$ greater than 0, then $m_1 > m_2 > m_3 > m_4$, i.e., whatever the value of the coefficient A and B, the following conclusion can be achieved by calculation of the above Formula ① to Formula ⑧:

the setting manner of A and B corresponding to the case |M|>|N| is that:
one of A and B is a negative number while the other one is a positive number, or, the following condition is satisfied when both A and B are negative numbers or both A and B positive numbers:
when A>0 and B>0, then B>$m_1$A, or $m_1$A>B>$m_2$A, or B<$m_4$A;
when A<0 and B<0, then B>$m_4$A, or $m_2$A>B>$m_1$A, or B<$m_1$A.

The setting manner of A and B corresponding to the case |M|<|N| is that:
both A and B are negative numbers or both A and B positive numbers, and the following condition is satisfied:
when A>0 and B>0, then $m_2$A>B>$m_3$A, or $m_3$A>B>$m_4$A;
when A<0 and B<0, then $m_4$A>B>$m_3$A, or $m_3$A>B>$m_2$A.

Optionally, in the first setting scheme, the first bridge arm R1 and the third bridge arm R3 have the first strain sensitivity A, the second bridge arm R2 and the fourth bridge arm R4 have the second strain sensitivity B; one of A and B is a negative number while the other one is a positive number, or, the following condition is satisfied when both A and B are negative numbers or both A and B positive numbers: when A>0 and B>0, then B>$m_1$A, or $m_1$A>B>$m_2$A, or B<$m_4$A; when A<0 and B<0, then B>$m_4$A, or $m_2$A>B>$m_1$A, or B<$m_1$A, $m_1$>$m_2$>$m_4$>0.

By using this setting manner of A and B in the first setting scheme, the sensitivity of the force sensor is higher.

Optionally, in the first setting scheme, the regulation resistor Ra and the corresponding force sensor 3 are located in the same layer; the regulation resistor Ra and the corresponding sensor 3 are made of the same material; the regulation resistor Ra and the regulation bridge arm of the corresponding force sensor 3 have the same ion doping type and concentration.

In the first setting scheme, the closer the regulation resistor Ra is to the corresponding force sensor 3, the easier it is for the regulation resistor Ra and the regulation bridge arm to generate the same strain under the same force.

Optionally, in the second setting scheme, the first bridge arm R1, the second bridge arm R2, the third bridge arm R3 and the fourth bridge arm R4 have the same strain sensitivity.

According to Equation One, if A is equal to B, the coefficient of X is 0, i.e., the force sensor will not have an output signal, but according to Equation Two, even if A=B, the coefficient of X is not 0, so it is applicable for the second setting scheme when the first bridge arm R1, the second bridge arm R2, the third bridge arm R3 and the fourth bridge arm R4 have the same strain sensitivity.

Optionally, in the second setting scheme, the first bridge arm R1 and the third bridge arm R3 have the first strain sensitivity A, the second bridge arm R2 and the fourth bridge arm R4 have the second strain sensitivity B; both A and B are negative numbers or both A and B positive numbers, and the following condition is satisfied: when A>0 and B>0, then $m_2A>B>m_3A$, or $m_3A>B>m_4A$; when A<0 and B<0, then $m_4A>B>m_3A$, or $m_3A>B>m_2A$, $m_2>m_3>m_4>0$.

By using this setting manner of A and B in the second setting scheme, the sensitivity of the force sensor is higher.

Optionally, in the second setting scheme, the regulation resistor Ra is made of a semiconductor material which is not ion-doped, and the force sensor 3 is made of a semiconductor material which is ion-doped.

If the force sensor 3 is made of a semiconductor material, since the semiconductor material which is not ion-doped has very small strain sensitivity, and the semiconductor material which is ion-doped has high stain sensitivity, therefore it is possible, by such a setting manner, to make a large difference between the strain sensitivity of the regulation resistor Ra and the strain sensitivity of the regulation bridge arm of the force sensor 3, without considering the distance between the regulation resistor Ra and the force sensor 3.

Optionally, in the second setting scheme, the distance between the regulation resistor Ra and the corresponding force sensor 3 is greater than or equal to 6 cm, the regulation resistor Ra and the force sensor 3 are made of a metal material.

If the force sensor 3 is made of a metal material, since metal has relatively larger strain sensitivity, if the regulation resistor Ra is also made of a metal material, it is required to set a larger distance between the regulation resistor Ra and the corresponding force sensor 3, so that the regulation resistor Ra is not involved in the strain of the corresponding force sensor 3.

Optionally, in the second setting scheme, the regulation resistor Ra is made of a semiconductor material which is not ion-doped, and the force sensor 3 is made of a metal material.

If the force sensor 3 is made of a metal material, since metal has relatively greater strain sensitivity, and the semiconductor material which is not ion-doped has very small stain sensitivity, therefore it is possible, by such a setting manner, to make a large difference between the strain sensitivity of the regulation resistor Ra and the strain sensitivity of the regulation bridge arm of the force sensor 3, without considering the distance between the regulation resistor Ra and the force sensor 3.

Optionally, as shown in FIG. 2, the force sensor is a Wheatstone bridge force sensor, and the Wheatstone bridge force sensor includes a first input end IN1, a second input end IN2, a first output end OUT1, and a second output end OUT2; wherein a first resistor R1 is connected in series between the first input end IN1 and the first output end OUT1, a second resistor R2 is connected in series between the first output end OUT1 and the second input end IN2, a third resistor R3 is connected in series between the second input end IN2 and the second output end OUT2, a fourth resistor R4 is connected in series between the second output end OUT2 and the first input end IN1; the first resistor R1, the second resistor R2, the third resistor R3 and the fourth resistor R4 are respectively the first bridge arm R1, the second bridge arm R2, the third bridge arm R3 and the fourth bridge arm R4.

Optionally, as shown in FIG. 5, the force sensor 3 is a silicon piezoresistive force sensor.

The silicon piezoresistive force sensor may be formed as a quadrilateral structure, and the four edges are respectively connected with the first input end IN1, the second input end IN2, the first output end OUT1 and the second output end OUT2; wherein the first input end IN1 and the second input end IN2 are respectively connected with two opposite edges, the first output end OUT1 and the second output end OUT2 are respectively connected with the other two opposite sides.

It should be noted that, whether it is the force sensor structure shown in FIG. 2 or the force sensor structure shown in FIG. 5, the force sensor can be equivalent to a bridge including a first bridge arm R1, a second bridge arm R2, a third bridge arm R3 and a fourth bridge arm R4 connected end-to-end in sequence. The connection between the first bridge arm and the fourth bridge arm is the first input end IN1, the connection between the second bridge arm and the third bridge arm is the second input end IN2, the connection between the first bridge arm and second bridge arm is the first output end OUT1, the connection between the third bridge arm and the fourth bridge arm is the second output end OUT2. When the display panel is not deformed, the ratio of the resistance of the first bridge arm to the resistance of the second bridge arm is equal to the ratio of the resistance of the fourth bridge arm to the resistance of the third bridge arm, the bridge reaches a balance state, the voltage value at the first output end OUT1 is equal to the voltage value at the second output end OUT2; when the display panel is deformed, all the above four bridge arms will be deformed, resulting in changes of the resistance value of each bridge arm, so that the bridge is out of the balance state, i.e., the ratio of the resistance of the first bridge arm to the resistance of the second bridge arm is not equal to the ratio of the resistance of the fourth bridge arm to the resistance of the third bridge arm, the voltage value at the first output end OUT1 is not equal to the voltage value at the second output end OUT2, the difference between the voltage value at the first output end OUT1 and the voltage value at the second output end OUT2 corresponds to the force value applied on the display panel, during the force detection process, the corresponding force value can be achieved by obtaining the voltage value at the first output end OUT1 and the voltage value at the second output end OUT2.

Optionally, as shown in FIG. 5, a second end of the regulation resistor Ra is connected with an edge of the corresponding silicon piezoresistive force sensor 3.

If the regulation resistor Ra is connected in the middle of the force sensor 3, the regulation voltage transmitted to the force sensor 3 via the regulation resistor Ra will affect each bridge arm and thus its compensation effect will be weak, however, if the regulation resistor Ra is connected with the edge of the force sensor 3, the influence of the regulation voltage generated by the connection between the regulation resistor Ra and the force sensor 3 on the corresponding regulation bridge arm can be maximized and thus the compensation effect becomes more remarkable.

Figure 12:
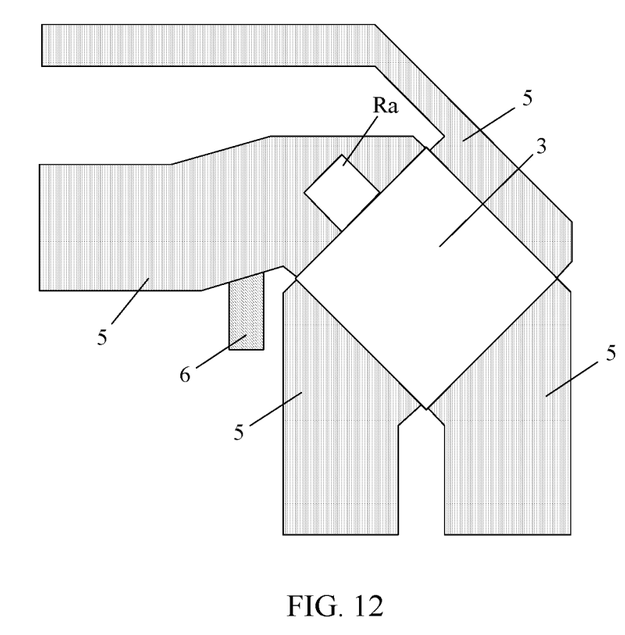
FIG. 12 is another enlarged schematic view of a portion of the display panel in FIG. 1.

Optionally, as shown in FIG. 12, FIG. 12 is another enlarged schematic view of a portion of the display panel in FIG. 1. The display panel further includes: a sensor wiring 5 connected with the silicon piezoresistive force sensor 3; a regulation resistor wiring 6 connected with the first end of the regulation resistor Ra; wherein the sensor wiring 5 and the regulation resistor wiring 6 are disposed in different layers.

The sensor wiring 5 is used to connect the input end of the force sensor 3 with a bias voltage input circuit so as to input the bias voltage. The sensor wiring 5 is further used to connect the output end of the force sensor 3 with the chip so as to detect the force. The regulation resistor wiring 6 is used to connect one end of the regulation resistor with the chip so as to input the regulation voltage. In order that the sensor wiring 5 does not interfere with the regulation resistor wiring 6, the sensor wiring 5 and the regulation resistor wiring 6 are disposed in different layers.

Optionally, as shown in FIG. 3, FIG. 4 and FIG. 12, the thin film transistor 4 further includes a source electrode 41, a drain electrode 42 and a gate electrode 44. The silicon piezoresistive force sensor 3 and the active layer 43 are located in the same layer; the sensor wiring 5 and gate electrode 44 are located in the same layer; the regulation resistor wiring 6, the source electrode 41 and the drain electrode 42 are located in the same layer.

When the silicon piezoresistive force sensor 3 and the active layer 43 are located in the same layer, the metal layer closest to the active layer 43 is the metal layer where the gate electrode 44 is located. Therefore, the sensor wiring 5 is formed simultaneously with the metal layer where the gate electrode 44 is located, the regulation resistor wiring 6 is formed simultaneously with the metal layer where the source electrode 41 and the drain electrode 42 are located.

It should be noted that, the above structure is merely exemplary. It is acceptable as long as the sensor wiring 5 and the regulation resistor wiring 6 are formed by using the metal layer originally provided in the display panel, and the sensor wiring 5 does not interfere with the regulation resistor wiring 6, for example, it is also possible that the sensor wiring 5, the source electrode 41 and the drain electrode 42 are located in the same layer, while the regulation resistor wiring 6 and the gate electrode 44 are located in the same layer.

For example, as shown in FIG. 3 and FIG. 4, when the display panel is a liquid crystal display panel, the display panel includes a plurality of gate lines 81 and a plurality of data lines 82. The plurality of gate lines 81 and the plurality of data lines 82 intersect with each other to define a plurality of sub-pixel electrodes distributed in a matrix, each of the sub-pixel electrodes is correspondingly provided with a thin film transistor 4. The source electrode 41 of the thin film transistor 4 is connected with the corresponding data line 82, the drain electrode 42 of the thin film transistor 4 is connected with the corresponding pixel electrode (not shown), the gate electrode 44 of the thin film transistor 4 is connected with the corresponding gate line 81. The liquid crystal display panel includes an array substrate and a color film substrate disposed opposite to each other, and a liquid crystal layer is disposed between the array substrate and the color film substrate. The data line 82 is used to transmit data signals, and the gate line 81 is used to transmit scan signals. During the operation of the liquid crystal display panel, the thin film transistors 4 corresponding to the plurality of gate lines 81 are sequentially turned on in row units under the control of the scan signals, meanwhile, the data line 82 sequentially transmits the data signal to the corresponding pixel electrode so that the pixel electrode can be charged, an electric field is formed between the pixel electrode and a common electrode to drive the liquid crystal in the liquid crystal layer to deflect, so as to achieve normal display. The color film substrate includes a grid-like black matrix, and a plurality of color resists arranged in an array and disposed in the opening of the black matrix. The color resists include a red resist, a green resist, and a blue resist. In FIG. 3, it merely shows a related structure of the liquid crystal display panel, in other implementing manners, the display panel may also be other types of display panel, and the embodiment of the present disclosure does limited the type of the display panel.

Figure 13:
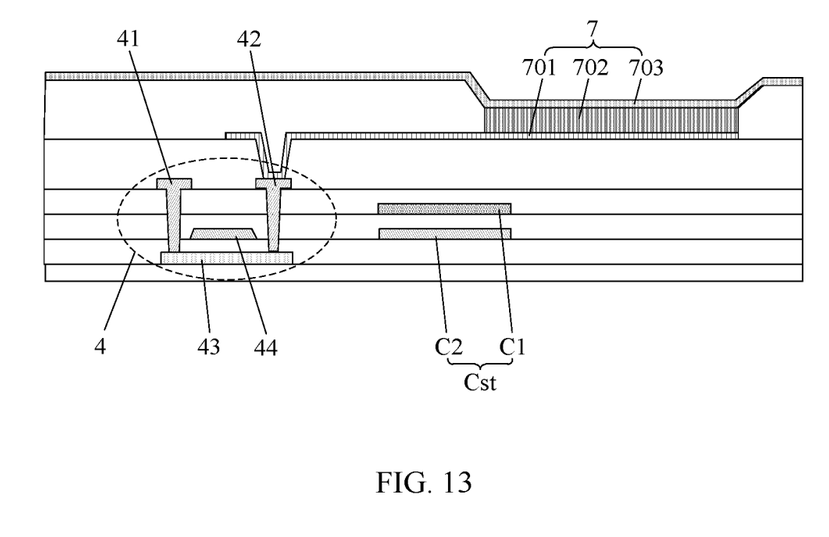
FIG. 13 is a cross-sectional structural schematic view of a portion of an organic light-emitting display panel in an embodiment of the present disclosure.

For example, the display panel is an organic light-emitting display panel, the organic light-emitting display panel includes an array substrate including a plurality of pixel circuits, and the organic light-emitting display panel further includes a plurality of organic light-emitting diodes (Organic Light-emitting Diode, OLED) disposed on the array substrate, the anode of each OLED is correspondingly electrically connected with the pixel circuit on the array substrate. As shown in FIG. 13, FIG. 13 is a cross-sectional structural schematic view of a portion of an organic light-emitting display panel in an embodiment of the present disclosure. Each OLED 7 includes an anode layer 701, a light-emitting layer 702 and a cathode layer 703 disposed sequentially. The pixel circuit includes a thin film transistor 4 including a source electrode 41, a drain electrode 42, a gate electrode 44 and an active layer 43. The pixel circuit further includes a storage capacitor Cst including a first electrode plate C1 and a second electrode plate C2. The gate electrode 44 and the second electrode plate C2 are located in a first conductive layer, the first electrode plate C1 is located in a second conductive layer, the source electrode 41 and the drain electrode 42 are located in a third conductive layer. The third conductive layer, the second conductive layer, the first conductive layer and the active layer 43 are sequentially disposed at a side of the anode layer 701 away from the cathode layer 703. The anode layer 701 of the OLED 7 is connected with the drain electrode 72 of the corresponding thin film transistor via a through hole. The plurality of light-emitting diodes includes a light-emitting diode for emitting red light, a light-emitting diode for emitting green light, and a light-emitting diode for emitting blue light. In addition, the organic light-emitting display panel further includes a packaging layer overlying the plurality of OLEDs. It should be noted that, FIG. 13 merely illustrates the storage capacitor Cst in the pixel circuit and one thin film transistor 4 directly connected with the OLED 7, and the layer structures of other transistors may be the same as that of the thin film transistor 4. In addition, the relation of the structure of each layer is not limited to the structure shown in FIG. 13, for example, the first electrode plate C1 and the second electrode plate C2 may be formed in other layers as long as it can form two electrode plates of a capacitor. If the OLED 7 is formed as a top-emitting structure, i.e., the OLED 7 emits light from a side of the cathode layer 703 far away from the anode layer 701, then each element in the pixel circuit can be disposed under the OLED 7; if the OLED 7 is formed as a bottom-emitting structure, i.e., the OLED 7 emits light from a side of the anode layer 701 away from the cathode layer 703, then each element in the pixel circuit needs to be disposed outside the light-emitting area of the OLED 7.

For example, the display panel is a micro light-emitting diode (Micro Light-Emitting Diode, Mic-LED) display panel, the Mic-LED display panel includes an array substrate including a plurality of pixel circuits, and the Mic-LED display panel further includes a plurality of Mic-LEDs disposed on the array substrate. The anode of each Mic-LED is correspondingly electrically connected with the pixel circuit on the array substrate. The plurality of Mic-LEDs includes a Mic-LED for emitting red light, a Mic-LED for emitting green light, and a Mic-LED for emitting blue light. Wherein, the Mic-LED can be manufactured on a growth substrate and subsequently transferred to the array substrate.

Figure 14:
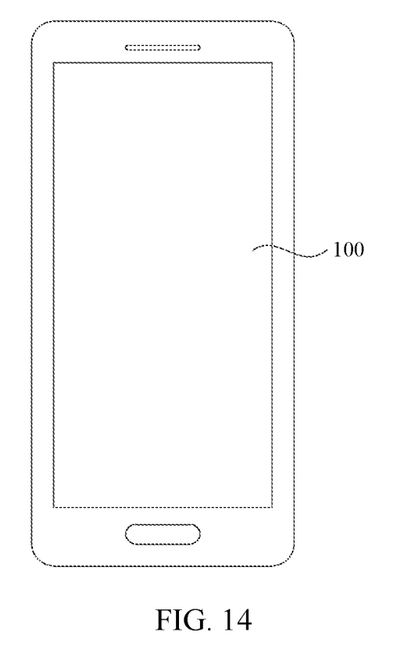
FIG. 14 is a structural schematic diagram of a display device in an embodiment of the present disclosure.

As shown in FIG. 14, FIG. 1 and FIG. 2, FIG. 14 is a structural schematic diagram of a display device in an embodiment of the present disclosure. The present disclosure further provides a display device, including: the above-described display panel 100, a control module 200, the control module 200 is configured such that, during zero-setting mode, the voltage value Ua at the voltage regulation end Ua is adjusted within the preset range, and the difference Uo of the output voltages between two output ends of the corresponding force sensor 3 is obtained, and when Uo reaches a preset condition, the corresponding Ua is taken as a replacement voltage value Uc, and Uc is taken as the voltage value at the voltage regulation end Ua after the zero-setting mode.

The control module 200 may be a driving chip, and the driving chip may be integrated on the display panel 100 or may be disposed at other positions of the display device. The voltage regulation end Ua is connected with the control module 200. The control module 200 is also connected with two output ends of each force sensor 3. The display device has a zero-setting mode, for example, after the display device is used for a period of time, due to the problem during production process, or the problem of abnormal force detection resulting from the heat generation during working, at this time, the user can control the display device to enter the zero-setting mode. In the zero-setting mode, the display panel needs to be kept without force applied thereon. First, the voltage value Ua at the voltage regulation end Ua is regulated within a preset range (for example, a range of −5V to 5V), meanwhile obtaining the difference Uo of the output voltages between two output ends of the corresponding force sensor 3, if Uo meets the preset range during the regulation process, the corresponding Ua is taken as the replacement voltage value Uc. The preset range means Uo is 0 or close to 0, when Uo is 0 or close to 0, the bridge of the force sensor 3 can be considered to be in a balance state. After the zero-setting mode, The replacement voltage value Uc is replaced as the voltage value at the voltage regulation end Ua, that is, after the zero-setting mode, the force sensor 3 is compensated to the balance state by regulating the voltage value at the voltage regulation end Ua. After that, the detection result can be more accurate when the force detection is conducted.

As for the display device in the present disclosure, a regulation resistor is further provided corresponding to each force sensor. When the display panel is not subjected to a force, if the four bridge arms of the force sensor are in an unbalance state, a voltage can be applied to the bridge arm via the regulation resistor, so that when the panel is not subjected to a force, the voltage value at the first output end is equal or close to the voltage value at the second output end, after regulation by the regulation resistor, it can be considered that the bridge arm of the force sensor is in a balance state. After that, the detection result can be more accurate when the force detection is conducted, thereby making improvements with respect to the problem of abnormal force detection.

Optionally, the control module 200 is configured such that, during the zero-setting mode, Ua is respectively adjusted to be a plurality of preset values, Uo corresponding to each preset value is obtained respectively, in a zero-setting mode, Ua corresponding to the Uo having the smallest absolute value is taken as the replacement voltage value Uc, and Uc is taken as the voltage value at the voltage regulation end after the zero-setting mode.

For example, eleven voltage values at the voltage regulation end Ua are preset to be −5V, −4V, −3V, −2V, −1V, 0V, 1V, 2V, 3V, 4V and 5V. During the zero-setting mode, the eleven voltage values are respectively taken as the voltage value at the voltage regulation end Ua, meanwhile the Uo corresponding to each preset value is obtained. Among the obtained eleven Uo, the Uo having the smallest absolute value is 0.41V, which is obtained when Ua=3V, then after the zero-setting mode, the voltage value at the voltage regulation end Ua is set to be 3V, so that the force sensor 3 can be compensated to be closer to a balance state, such a regulation manner is relatively simple.

The apparatus embodiments described above are merely illustrative, wherein the units described as separated parts can be or not be physically separated, and the components shown as units can be or not be physical units, that is, the components can be located in one place or distributed in multiple network units. Part or all of the units can be selected to achieve the purposes of the solutions of the embodiments according to actual demands. Person skilled in the art can understand and implement without creative work.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
   a thin film transistor arranged in a display area of the display panel, the thin film transistor comprising an active layer;
   a metal layer;
   a plurality of force sensors disposed in a same layer as one of the active layer and the metal layer, each of the plurality of force sensors comprising a first bridge arm, a second bridge arm, a third bridge arm, and a fourth bridge arm connected end-to-end in sequence; and
   a plurality of regulation resistors, each corresponding to a respective one of the plurality of force sensors, each of the plurality of regulation resistors comprises a first end connected to a voltage regulation end and a second end connected to a regulation bridge arm of the respective force sensor, wherein each regulation bridge arm is any one of the first bridge arm, the second bridge arm, the third bridge arm, and the fourth bridge arm of the respective force sensor.

2. The display panel according to claim 1, wherein
   the force sensor and the regulation resistor corresponding to the force sensor are located in a rectangular area;
   a length of each edge of the rectangular area is less than 300 μm; and
   the regulation bridge arm of the force sensor and the regulation resistor corresponding to the force sensor have the same strain sensitivity.

3. The display panel according to claim 2, wherein the first bridge arm and the third bridge arm have a first strain sensitivity A, and the second bridge arm and the fourth bridge arm have a second strain sensitivity B; and a relation between A and B meets one of following eight conditions:

when A>0, then B<0;
when A<0, then B>0;
when A>0 and B>0, then B>$m_1$A;
when A>0 and B>0, then $m_1$A>B>$m_2$A;
when A>0 and B>0, then B<$m_4$A;
when A<0 and B<0, then B>$m_4$A;
when A<0 and B<0, then $m_2$A>B>$m_1$A;
when A<0 and B<0, then B<$m_1$A;
wherein $m_1$, $m_2$, $m_4$ is a coefficient of A, and $m_1$>$m_2$>$m_4$>0.

4. The display panel according to claim 2, wherein
the force sensor and the regulation resistor corresponding to the force sensor are disposed in the same layer;
the force sensor and the regulation resistor corresponding to the force sensor are made of the same material; and
the regulation bridge arm of the force sensor and the regulation resistor corresponding to the force sensor have the same ion doping type and concentration.

5. The display panel according to claim 1, wherein
a distance between each force sensor and the respective regulation resistor is not less than 6 cm; or
a ratio of a strain sensitivity of the respective regulation resistor to a strain sensitivity of the regulation bridge arm of each force sensor is less than 5%.

6. The display panel according to claim 5, wherein
for each of the plurality of force sensors, the first bridge arm, the second bridge arm, the third bridge arm and the fourth bridge arm have the same strain sensitivity.

7. The display panel according to claim 5, wherein
for each of the plurality of force sensors, the first bridge arm and the third bridge arm have a first strain sensitivity A, and the second bridge arm and the fourth bridge arm have a second strain sensitivity B; and
a relation between A and B meets one of following four conditions:

when A>0 and B>0, then $m_2$A>B>$m_3$A, $m_2$>$m_3$>$m_4$>0;
when A>0 and B>0, then $m_3$A>B>$m_4$A;
when A<0 and B<0, then $m_4$A>B>$m_3$A;
when A<0 and B<0, then $m_3$A>B>$m_2$A;
wherein $m_2$, $m_3$, $m_4$ is a coefficient of A, and $m_2$>$m_3$>$m_4$>0.

8. The display panel according to claim 5, wherein
for each of the plurality of force sensors, the regulation resistor is made of semiconductor material without being ion-doped, and the force sensor is made of semiconductor material being ion-doped.

9. The display panel according to claim 5, wherein
a distance between each force sensor and the respective regulation resistor is not less than 6 cm, each force sensor and the respective regulation resistor are made of metal material.

10. The display panel according to claim 5, wherein
for each of the plurality of force sensors, the regulation resistor is made of semiconductor material without being ion-doped, and the force sensor is made of metal material.

11. The display panel according to claim 1, wherein
each of the plurality of force sensors is a Wheatstone bridge force sensor, the Wheatstone bridge force sensor comprises a first input end, a second input end, a first output end and a second output end; a first resistor is connected in series between the first input end and the first output end, a second resistor is connected in series between the first output end and the second input end, a third resistor is connected in series between the second input end and the second output end, a fourth resistor is connected in series between the second output end and the first input end; and the first resistor, the second resistor, the third resistor, and the fourth resistor are respectively the first bridge arm, the second bridge arm, the third bridge arm, and the fourth bridge arm.

12. The display panel according to claim 1, wherein
each of the plurality of force sensors is a silicon piezoresistive force sensor.

13. The display panel according to claim 12, wherein
for each of the plurality of force sensors, an edge of the silicon piezoresistive force sensor is connected with the second end of the regulation resistor corresponding to the force sensor.

14. The display panel of claim 13, further comprising:
a sensor wiring connected with the silicon piezoresistive force sensor; and
a regulation resistor wiring connected with the first end of the regulation resistor;
wherein the sensor wiring and the regulation resistor wiring are disposed in different layers.

15. The display panel according to claim 14, wherein
the thin film transistor further comprises a source electrode, a drain electrode and a gate electrode;
the silicon piezoresistive force sensor and the active layer are disposed in a same layer;
the sensor wiring and the gate electrode are disposed in a same layer; and
the regulation resistor wiring, the source electrode and the drain electrode are disposed in a same layer.

16. A display device, comprising a display panel and a control module, wherein the display panel comprises:
a thin film transistor arranged in a display area of the display panel, the thin film transistor comprising an active layer;
a metal layer;
a plurality of force sensors disposed in a same layer as one of the active layer and the metal layer, each of the plurality of force sensors comprising a first bridge arm, a second bridge arm, a third bridge arm, and a fourth bridge arm connected end-to-end in sequence; and
a plurality of regulation resistors, each corresponding to a respective one of the plurality of force sensors, each of the plurality of regulation resistors comprises a first end connected to a voltage regulation end and a second end connected to a regulation bridge arm of the respective force sensor, wherein each regulation bridge arm is any one of the first bridge arm, the second bridge arm, the third bridge arm, and the fourth bridge arm of the respective force sensor,
the control module is configured to, during a zero-setting mode, adjust a voltage value Ua at the voltage regulation end within a preset range, and acquire an output voltage difference Uo between two output ends of the force sensor; when Uo reaches a preset condition, the zero-setting mode terminates, take Ua at this moment as a replacement voltage value Uc, and take Uc as the voltage value at the voltage regulation end.

17. The display device according to claim 16, wherein
the control module is further configured to, during the zero-setting mode, respectively adjust Ua to be a plurality of preset values, and respectively acquire Uo corresponding to each preset value, take a Ua corresponding to a Uo having the smallest absolute value as the replacement voltage value Uc, and take Uc as a voltage value at the voltage regulation end after the zero-setting mode terminates.

* * * * *